July 10, 1945.    H. F. BENNETT    2,380,210
TELECENTRIC LENS SYSTEM
Filed Dec. 14, 1943
FIG. 1.
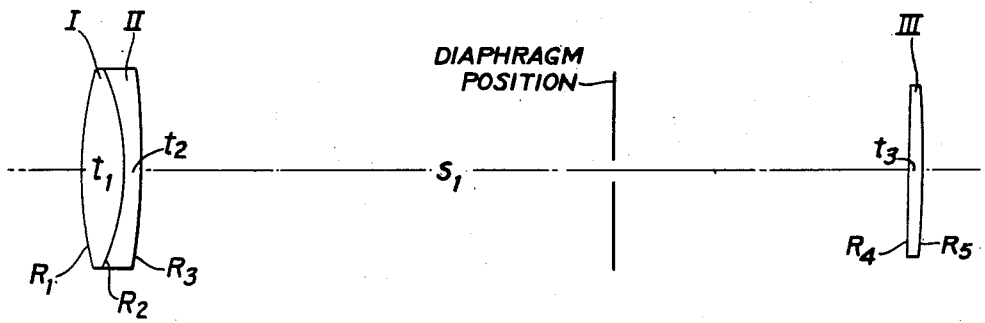
FIG. 2.
| EF = 100 mm. | | | | |
|---|---|---|---|---|
| LENS | N | V | RADII | THICKNESSES |
| I | 1.518 | 59.6 | $R_1 = +71.2$ | $t_1 = 7.2$ |
| II | 1.649 | 33.8 | $R_2 = -31.2$ | $t_2 = 3.8$ |
|  |  |  | $R_3 = -74.0$ | $S_1 = 144.$ |
| III | 1.517 | 64.5 | $R_4 = \infty$ | $t_3 = 2.4$ |
|  |  |  | $R_5 = -240.$ |  |
DIAPHRAGM POSITION 82.5 mm. FROM $R_3$
CONJUGATES AT 10X MAGNIFICATION
SHORT CONJUGATE 74 mm. FROM $R_1$
LONG CONJUGATE 928 mm. FROM $R_5$
FIG. 3.
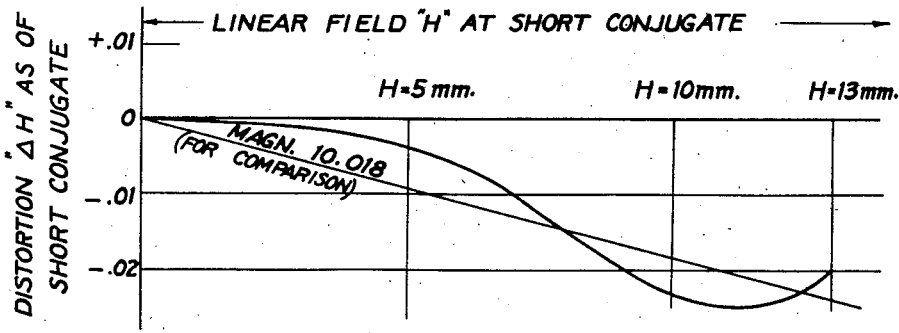
HAROLD F. BENNETT
INVENTOR
BY
ATTY & AG'T Patented July 10, 1945

2,380,210

UNITED STATES PATENT OFFICE 2,380,210

TELECENTRIC LENS SYSTEM

Harold F. Bennett, Rochester, N. Y., assignor to Eastman Kodak Company, Rochester, N. Y., a corporation of New Jersey Application December 14, 1943, Serial No. 514,231

4 Claims. (Cl. 88—57)

This invention relates to telecentric lens systems such as used in contour projectors.

Telecentric objectives were independently discovered by Porro in 1848 and Abbe in 1878. The distinguishing feature of this type of lens is that the pupil is at infinity on one side of the lens system. That is to say, the principal rays on that side of the system are parallel to the axis. To avoid ambiguity in this discussion, this side of the lens system will be considered as the short conjugate side and also as the front. An object placed on this side of the lens and viewed from the other side, or, alternatively, projected onto a screen on the other side of the lens, is seen with the same magnification regardless of its being moved in and out of focus. Also, an object of considerable thickness can be projected, and the parts nearer to the lens will have the same magnification as those farther from the lens.

The diaphragm, of course, is not actually placed at infinity but rather the diaphragm is placed in the conjugate plane which is at the principal focus of the lens system so that its image is at infinity. An alternative arrangement is to illuminate the object with collimated light from a small source. The image of that small source is then at infinity in front of the telecentric system, and its image in the focal plane of the latter acts in about the same manner as a physical diaphragm would.

Lenses of this type tend to suffer from pincushion distortion on the projection screen, which becomes barrel distortion if computed as of the object side. This pincushion distortion is caused by the aberrations of the lens system, that is, the principal rays farther from the axis are bent disproportionately so that they cross the axis at the diaphragm position at too steep an angle and strike the projection screen too far from the axis on the other side.

According to the present invention, the distortion is very highly corrected in a telecentric projection lens consisting of a front positive component and a rear positive component with a diaphragm enclosed therebetween, in which the front component consists of a biconvex element cemented to the front of a meniscus element whose refractive index is higher by at least 0.1, and the rear positive component is between 0.4 and 0.9 times as far from the diaphragm as is the front component and has a focal length between 5 and 12 times its distance from the diaphragm, wherein the power of that surface of the rear component which faces the diaphragm is numerically less than the power of the whole component. Preferably the refractive index of the negative element is greater than 1.62. It is also preferable that the rear component be a simple element whose refractive index is less than 1.55.

It is advantageous to make the front component approximately equi-convex, that is, neither of its outer surfaces should have a radius greater than twice that of the other one.

In the accompanying drawing:

Figures 1 and 2 show a lens according to the invention and with all the preferred features thereof.

Figure 3 shows the distortion as of the short conjugate side at 10 times magnification.

The data for this example on a focal length of 100 mm. is as follows:

| Lens | N | V | Radii | Thicknesses |
|---|---|---|---|---|
| I | 1.5178 | 59.6 | $R_1=+71.2$ mm. | $t_1=7.2$ mm. |
| II | 1.6490 | 33.8 | $R_2=-31.2$ mm. | $t_2=3.8$ mm. |
|   |   |   | $R_3=-74.0$ mm | $s_1=144$ mm. |
| III | 1.5170 | 64.5 | $R_4= \infty$ | $t_3=2.4$ mm. |
|   |   |   | $R_5=-240$ mm. |   |

This example was designed for a magnification of 10, but, of course, the magnification can be varied considerably. When used at this magnification the object is placed at a distance of 74 mm. in front of the lens and the projection screen at about 900 mm. behind the rear surface of the lens. The diaphragm is placed at a distance of 82.5 mm. behind the front component.

The distortion has been computed on the short conjugate side of the objective and is shown in the following table also graphically in Figure 3 of the drawing:

| H | $\Delta H$ | Assumed $\Delta H$ |
|---|---|---|
| Paraxial | 0.000 | $+0.0018H$ |
| 7.2 | −0.011 | +0.002 |
| 9.1 | −0.019 | −0.002 |
| 11.0 | −0.024 | −0.004 |
| 12.9 | −0.019 | +0.004 |

In this table the first column gives the height H of the object point above the axis, and the second column gives the distortion $\Delta H$, all in millimeters. It will be noted that the distortion is not proportional to the cube of the height, as is theoretically true of the first order or Seidel distortion, but has a zonal shape due to the effect of higher order distortion. As a result it follows more closely a straight line than the theoretical distortion is supposed to. It can be assumed that this produces an average effective magnification of 10.018. The third column of the table was obtained by computing the deviation of the actual image points from the positions which they would have if the magnification were 10.018 and the system were free from distortion. These data are also reduced to the short conjugate side of the lens system and it will be observed that a smooth curve drawn thru these points deviates from the assumed theoretical 10.018 magnification by less than plus or minus 0.01 mm. Thus the final image appears undistorted.

This lens is useful in checking the manufacture of certain very accurately made products even when the thickness of the object is greater than 40 mm. The lens not only has sufficient freedom from distortion but also the principal rays on the object side of the lens system are very strictly parallel to the axis so that the front edges and the back edges show up clearly with the same magnification. The curvature of field of the lens is also negligible. It had not previously been thought possible to achieve all of these desirable ends especially with a lens structure so simple as this.

What I claim is:

1. A telecentric projection lens consisting of front and rear positive components with a diaphragm enclosed therebetween, in which the front component consists of a biconvex element cemented to the front of a meniscus negative element whose refractive index is higher by at least 0.1, the separation of the two components being greater than the focal length of the front component and in which the rear positive component is between 0.4 and 0.9 times as far from the diaphragm as is the front component, has a focal length between 5 and 12 times its distance from the diaphragm, and the power of that surface of the rear component which faces the diaphragm is numerically less than the power of the whole component.

2. A telecentric lens according to claim 1 in which the index of refraction of said negative element is greater than 1.62.

3. A telecentric lens according to claim 1 in which the rear component is a simple element whose refractive index is less than 1.55.

4. A telecentric objective substantially according to the following table:

| Lens | N | V | Radii | Thicknesses |
|---|---|---|---|---|
| I | 1.52 | 60 | $R_1=+0.7F$ | $t_1=0.07F$ |
| II | 1.65 | 34 | $R_2=-0.3F$ | $t_2=0.04F$ |
|   |   |   | $R_3=-0.7F$ | $s=1.4F$ |
| III | 1.52 | 64 | $R_4>10F$ | $t_3=0.02F$ |
|   |   |   | $R_5=-2.4F$ |   | where the first column shows the lenses numbered from front to rear, the second column shows the respective indices of refraction for the D line of the spectrum, the third column shows the respective dispersive indices, the fourth column shows the radii of curvature also numbered from front to rear, the fourth radius being given in absolute value and the others with + or − signs respectively pertaining to surfaces which are convex or concave to the front, and the fifth column shows the respective thicknesses and spacing, and where F is the focal length of the objective.

HAROLD F. BENNETT.